United States Patent
Buck et al.

[11] Patent Number: 5,627,752
[45] Date of Patent: May 6, 1997

[54] CONSUMPTION-ORIENTED DRIVING-POWER LIMITATION OF A VEHICLE DRIVE

[75] Inventors: Michael Buck, Winennden; Wolf Boll, Weinstadt; Günther Knörzer, Sachsenheim, all of Germany

[73] Assignee: Mercedes-Benz AG, Germany

[21] Appl. No.: 364,198

[22] Filed: Dec. 27, 1994

[30] Foreign Application Priority Data

Dec. 24, 1993 [DE] Germany .................. 43 44 369.9

[51] Int. Cl.⁶ ................... B60L 3/00; B60K 1/04
[52] U.S. Cl. ............... 364/424.04; 364/431.01; 364/442; 180/65.8; 180/423.098
[58] Field of Search ............ 364/424, 424.01, 364/424.04, 442, 431.01; 340/249, 201 R; 73/114; 74/866; 60/641.8; 180/65.2, 65.1, 65.8

[56] References Cited

U.S. PATENT DOCUMENTS

| | | | |
|---|---|---|---|
| 3,997,888 | 12/1976 | Kremer | 340/249 |
| 4,188,618 | 2/1980 | Weisbart | 340/201 R |
| 4,444,047 | 4/1984 | Kern | 73/114 |
| 4,515,040 | 5/1985 | Takeuchi et al. | 74/866 |
| 4,685,061 | 8/1987 | Whitaker | 364/424 |
| 4,731,727 | 3/1988 | Rauch et al. | 364/442 |
| 4,876,854 | 10/1989 | Owens | 60/641.8 |
| 5,065,320 | 11/1991 | Hayashi et al. | 364/424.01 |
| 5,318,142 | 6/1994 | Bates et al. | 180/65.2 |

FOREIGN PATENT DOCUMENTS

| | | |
|---|---|---|
| 0530717 | 3/1993 | European Pat. Off. . |
| 0537081 | 4/1993 | European Pat. Off. . |
| 0548748 | 6/1993 | European Pat. Off. . |
| 3001470C2 | 7/1981 | Germany . |
| 2121971 | 1/1984 | United Kingdom . |

OTHER PUBLICATIONS

French Search Report dated Apr. 18, 1996.

*Primary Examiner*—Kevin J. Teska
*Assistant Examiner*—Russell W. Frejd
*Attorney, Agent, or Firm*—Evenson, McKeown, Edwards & Lenahan P.L.L.C.

[57] ABSTRACT

A method for assisting the driver of a vehicle in the optimum use of the on-board energy supply, by consumption-oriented driving-power limitation, especially for electric vehicles. A permissible consumption rate related to the remaining distance is determined continuously starting from the available energy supply and this section consumption is used, taking into account the driving resistances, to determine a set point value which controls a device for driving-power limitation. In a preferred embodiment, an electronic accelerator pedal is provided, with a pedal travel divided into two angular ranges, the second angular range requiring an increased actuating force and being allocated to a power range inhibited in accordance with the set point value. The division into the two angular ranges is adjustable by means of a positioning motor as a function of the permissible section consumption.

16 Claims, 3 Drawing Sheets

CONSUMPTION-ORIENTED DRIVING-POWER LIMITATION OF A VEHICLE DRIVE

BACKGROUND AND SUMMARY OF THE INVENTION

The invention relates to a method and apparatus for the consumption-oriented driving-power limitation of a vehicle drive, and to a device for driving-power limitation. The method according to the invention can be applied to vehicles of all kinds on water, on land and in the air, which carry an energy accumulator for the provision of the driving energy, especially electric vehicles with traction batteries.

German patent document DE 30 01 470 C2 discloses a travelling-data computer with an associated indicator for motor vehicles, by means of which current information, such as, for example, instantaneous operating parameter values of the vehicle, and information determined from such parameter values and from values input by the driver, can be called up as required. Thus, for example, it should be possible to call up the available travelling range remaining on the basis of the instantaneous content of the fuel tank, the instantaneous fuel consumption and an average fuel consumption derived therefrom. Similarly, by inputting the stretch of road ahead (distance) and the desired arrival time, the computer should calculate the nominal speed to be maintained, and display it. A speed limit value can also be input, so that reaching or exceeding the limit may be indicated by an acoustic or optical signal.

With the indication of the range and the speed limiter, the known travelling-data computer gives the driver only a rough guide in the allocation of the existing fuel supply. For motor vehicles with an internal combustion engine, this is not critical, since there is generally a relatively dense network of filling stations available.

However, this is not the case for electric vehicles operated with a battery. It is absolutely essential that the vehicle should not inadvertently be stuck en route, because the network of recharging stations is not yet very extensive relative to currently possible driving ranges. Since, moreover, a recharging operation can be very time-consuming, it may be worthwhile, by a deliberately restrained manner of driving, to allocate the existing energy supply in such a way that it is just sufficient to reach the destination.

It is an object of the present invention to provide a method and apparatus to assist the vehicle user in reaching his destination as rapidly as possible using a given energy supply in a substantially optimum and economical manner.

This object is achieved according to the invention, based on the recognition that the range of vehicles with on-board energy accumulators falls drastically as the travelling speed increases. This is attributable, on the one hand, to the increase in travelling resistance with travelling speed and, on the other hand, to the poorer efficiency of the prime movers and many energy accumulators in the upper power range. Particularly in the case of electric energy accumulators, the resistance losses increase with the power demand. By controlling the driving power, especially by specifying a guideline speed determined by the computer as a function of the stretch of road to be travelled, the method according to the invention allows optimum utilization of the energy supply of the energy accumulator without running the risk that the energy supply will be exhausted before the destination is reached. This is achieved, in particular, by continuously updating the set point for driving-power limi-tation as the vehicle travels along, and adapting it to the actual energy supply still available and to the remaining distance ahead. This arrangement has the further advantage that it is possible to calculate the energy safety reserves more closely, which reduces the weight of the vehicle and contributes to economy.

Other objects, advantages and novel features of the present invention will become apparent from the following detailed description of the invention when considered in conjunction with the accompanying drawings.

DETAILED DESCRIPTIONS OF THE DRAWINGS

Figure 1:
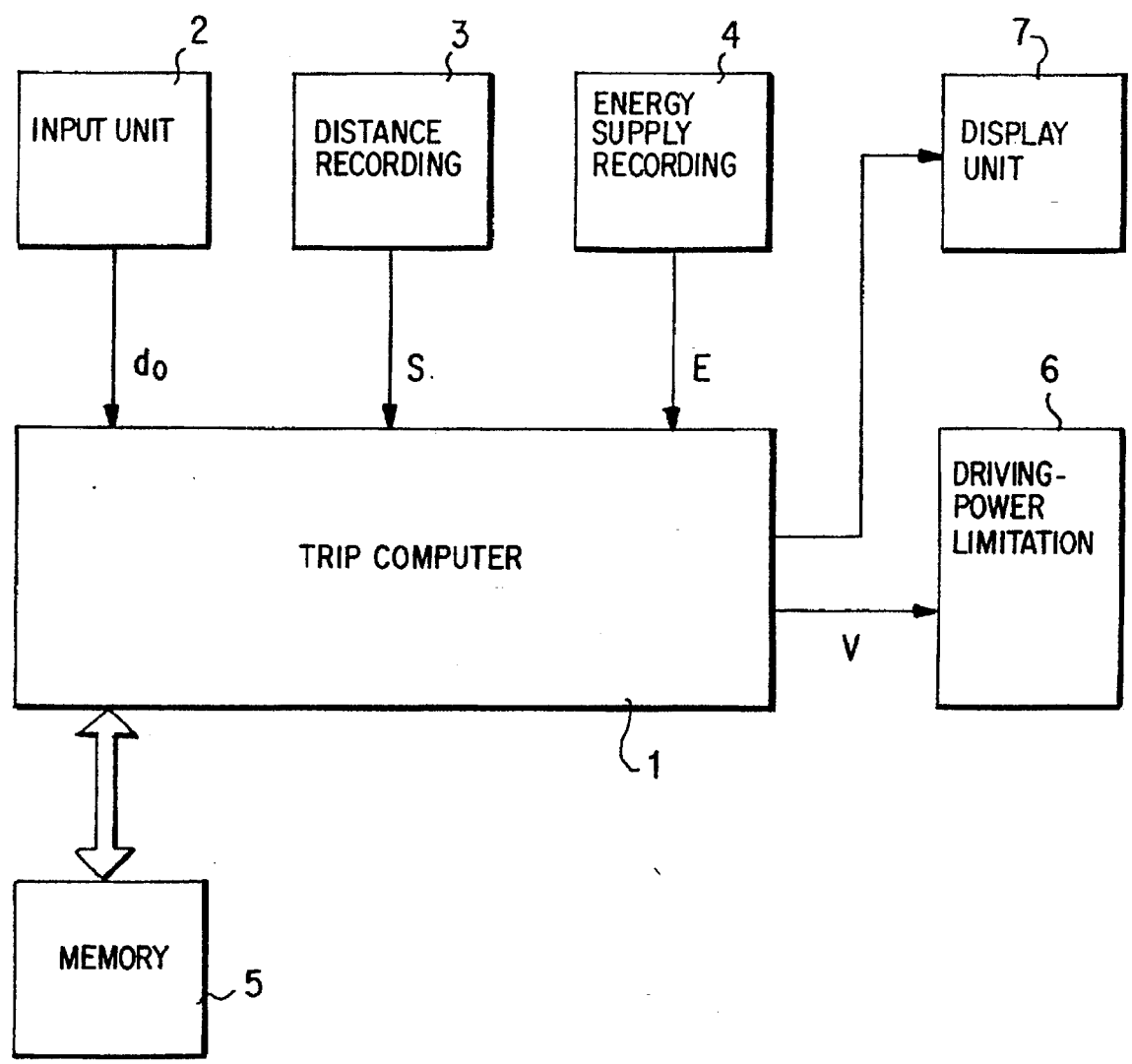
FIG. 1 is a block diagram of the device for carrying out the method according to the invention.

The essential components required for carrying out the method according to the invention are shown in FIG. 1. A trip computer 1 receives data on the journey ahead from the vehicle user via an input unit 2 and combines these data with vehicle-related measurement data, in particular a distance recording 3 and an energy-supply recording 4, to determine a set point V for a device for driving-power limitation 6. The trip computer 1 may also make use of empirical data stored in a memory 5. If the trip computer 1 also undertakes navigation tasks, road-network information is also stored in the memory 5. Also provided is a display unit 7 which is used for the menu-guided input of the journey data and to inform the vehicle user.

Figure 2:
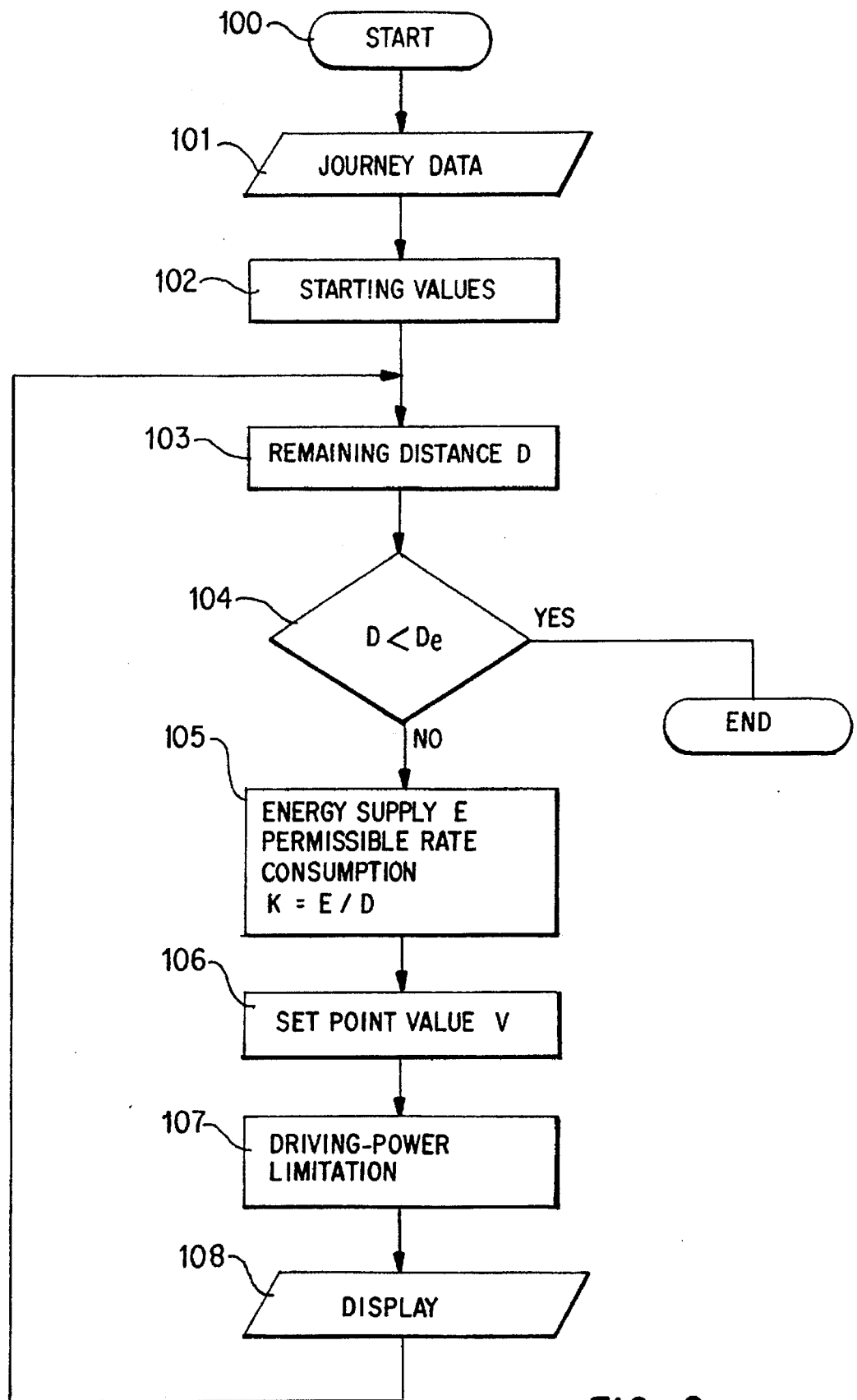
FIG. 2 is a flow chart which illustrates the steps comprising the method according to the invention.

The essential method steps according to the invention are shown in FIG. 2 and are described in detail below. The start of the method, step 100, is initiated either automatically at the beginning of each journey or by inputting a special command, e.g. by operating an appropriate button.

In step 101, the vehicle user inputs the journey data, which are related to the stretch of road ahead and can be used for as accurate a calculation as possible of the probable energy requirement. The most important datum relates to the distance to be covered. Further possible data relate to deviations from the standard conditions initially assumed (that it, the default setting). The latter may include, for example the type of geodetic route profile ahead (flat, hilly, mountainous), the net altitude difference to be overcome between start and arrival, traffic conditions (town, secondary road, expressway), the number of occupants and whether an energy reserve is to be preserved. As a further possibility, a data set specific to a particular route may be input by means of a single command, e.g. "home to work". This data set can be stored by the driver, either by manual input or by the recording of the actual values during a test run along the route.

In step 102, the starting values required for the further calculations are determined and allocated, taking into account the journey data. The most important starting value is the beginning distance $D_0$ to the destination.

Step 103 is the first step of a method loop in which the driving-power limitation during driving is adapted continuously to the current energy supply. In step 103, the distance S covered since starting is interrogated and the remaining distance $D=D_0-S$ ahead is determined.

In step 104, there follows an interrogation as to whether the destination has been reached, based on the remaining distance D determined in step 103. That is, if the remaining distance is below a predetermining limiting value (D<$D_E$), the destination has almost been reached and the method is ended. Otherwise, the method is continued with step 105, in which the current energy supply E is interrogated and the consumption rate per unit distance K=E/D permitted for covering the remaining distance D is determined. Although this consumption rate K may be exceeded for a brief period, it must be complied with on average in order to be able to reach the destination with the existing energy supply E.

In step 106, the set point value V for the driving-power limitation is calculated on the basis of the permissible consumption rate K. The relationship between the corresponding set point value V for the driving-power limitation and the consumption rate K is determined by a stored characteristic map or by a formula. Provision can further be made for the formula or the characteristic map to be adapted by means of various parameters to deviations from the standard conditions, the starting values determined in step 102 from the journey data initially defining the parameters. Continuous adaptation of the parameters to the conditions of driving is also possible. A technical embodiment which makes use of a speed set point for driving-power limitation is described below.

In step 107, the calculated set point value V is passed to the device for driving-power limitation, for example a speed limiter.

In step 108, the vehicle user is simultaneously informed on a display panel of all the important data and parameters which are significant for the allocation of the energy supply, such as, for example, the total distance, the remaining distance, the range and the anticipated journey time at the current speed of travel.

After step 108, the program returns to step 103, thereby closing the method loop. The method cycle can either be performed continuously or at intervals of journey time or distance along the route. A method cycle may also be brought about by a defined event, e.g. by driving away after a relatively long stop, which would have the advantage that refilling of the energy accumulator by "refueling" during the journey would immediately be taken into account in the calculation of the set point value V. It is also possible for a new method cycle to be brought about by a reset command which can be input, for example, via the input unit.

In operation, the consumption rate actually achieved on a route section will generally deviate from the permissible consumption rate K taken as a basis for the driving-power limitation. This is because, on the one hand, the driving-power limitation represents only an upper limit which may also be undershot during driving and, on the other hand, only a rough estimate can be made as to what effect the driving-power limitation will actually have on the consumption rate on the route section ahead. In addition, unforeseen influences such as, for example, a strong headwind or a large amount of traffic can have a considerable effect on energy consumption. However, an incorrect estimate of the driving conditions is compensated for in the following method cycle because the next set point value V is determined as a function of the actually existing energy supply E. As a result, increased consumption on one route section, for example, leads to a more severe driving-power limitation and hence energy saving on the following stretch of road. For stable control dynamics, however, it is advantageous if the relationship between the set point value V and the permissible consumption rate K taken as a basis is adapted so well to the real driving conditions that the permissible consumption rate K is actually complied with.

Various means are possible for driving-power limitation, e.g. rotational speed limitation, inhibition of the driving power above an acceleration or speed limit. Direct power limitation is also possible, for example, by fuel-supply limitation in the case of the diesel internal combustion engine or current limitation in the case of the electric vehicle. The latter is particularly worthwhile because the energy that can be taken from the battery decreases disproportionately with the discharge current and would result in a severe drop in the range in the upper load range. Further possibilities for driving-power limitation are to display a guideline speed upon the exceeding of which a warning signal is emitted or in specifying a cruising speed to a cruise control.

Details are given below of calculation methods for the set point value V which can be used in step 106. The specific embodiment relates to the case where an average speed v to be maintained is passed as the set point value V to a corresponding device for driving-power limitation. If the device for driving-power limitation consists of a speed limiter, the limiting speed can, for example, be derived from the average speed v to be maintained by multiplication with a constant.

Figure 3:
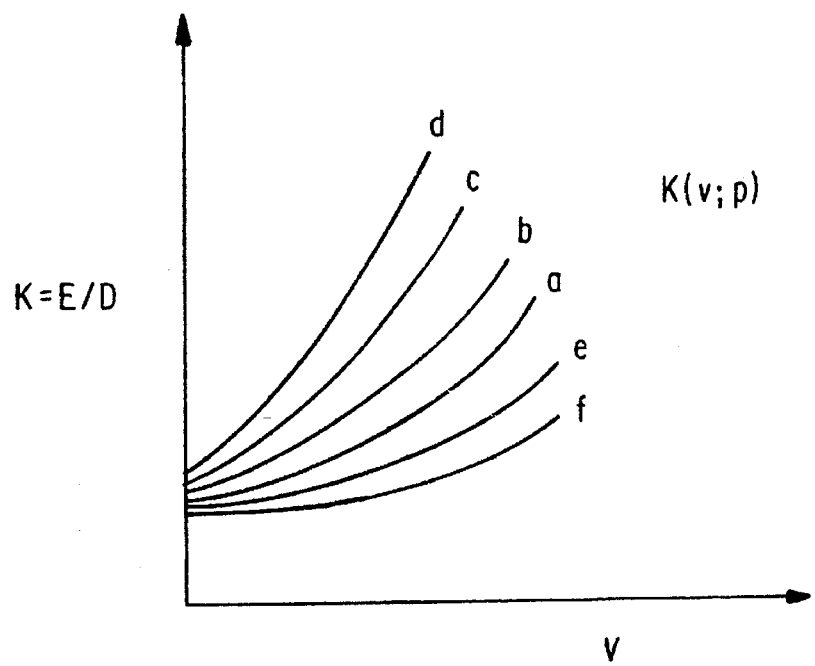
FIG. 3 shows typical characteristic curves for the section consumption.

For a particular vehicle and given driving conditions such as, for example, a flat secondary road with a moderate amount of traffic), the relationship between the average consumption rate K and the average speed v can be determined empirically. FIG. 3 shows a representative consumption family of characteristics K(v,p), which is parameterized in accordance with various driving conditions p=a, b . . . f. The characteristics for the consumption rate incorporates, on the one hand, the external driving resistances such as air resistance, rolling resistance, gradient resistance, braking resistance and acceleration resistance, and the transmission efficiency of the drive train and the engine/motor consumption characteristic map. All the characteristics show a disproportionate rise as the average speed v increases, this being attributable above all to the fact that the air resistance rises as the square of the speed v. The characteristics shown represent examples of the following driving situations:

a) flat secondary road, moderate traffic density (standard condition);
b) urban traffic;
c) undulating topography;
d) hilly mountainous topography, uphill;
e) motorway with low traffic density; and
f) hilly topography, downhill.

Further subdivisions of the characteristics and allocation to different driving conditions are readily possible. Modification of the characteristics by means of multiplicative or additive influencing terms is equally conceivable.

Since the characteristics in FIG. 3 are intended to be used to calculate the average speed v to be maintained for a given permissible consumption rate K, it would in principle be necessary always to take as a basis the characteristic which would be obtained empirically as an average for the whole of the stretch of road ahead. Since this is generally unknown, only estimates can be made. Some estimation methods for the characteristic corresponding to the stretch of road ahead are described below.

In the case of the first estimation method, a single characteristic is taken as a basis for the whole of the stretch of road. This has been recorded empirically beforehand under standard conditions, in general by the vehicle manufacturer. If, at the beginning of the journey, more specific journey data deviating from the standard conditions have been made, the corresponding characteristic is selected from the family of characteristics K(v<p) (FIG. 3), this family comprising the empirical characteristics for all possible driving conditions p foreseen.

Provision can furthermore be made for the vehicle user to identify the characteristic for a specific journey, e.g. the journey to work, empirically on a trial run, after which this characteristic can be called up by inputting the command "home to work". The process of empirical allocation can be such that the characteristic in FIG. 3 is allocated to the route which comes nearest to the point defined by the actual consumption rate <K> on the trial run and the average speed <v> achieved during this run.

Where, in addition to the driving power, there is also a similar usage of power for loads in the vehicle, for example, for heating or light, the resulting energy consumption can be taken into account by the computing method in FIG. 2 in the following manner: during the journey, the load power is determined continuously and, when multiplied with the estimated remaining journey time, this represents the estimated energy consumption on the whole of the stretch of road ahead. Since this energy consumption is not available for the driving power, the anticipated load energy must be subtracted from the existing energy supply before the permissible section consumption is determined in step 105. The estimated remaining journey time can be determined, for example, from the remaining distance D ahead and the permissible speed v last determined.

In the case of the second estimation method for the characteristic corresponding to the stretch of road ahead, the method described above is further developed such that the definition of the characteristic carried out at the beginning of the journey on the basis of the journey data is not retained for the entire stretch of road but is adapted to existing conditions. For this purpose, the actual consumption rate <K> and the average speed <v> achieved on the stretch of road travelled are continuously determined and a characteristic allocated to this pair of values is used to correct the characteristic last used or the initial characteristic. The characteristic updated in this way is then taken as a basis for the calculation of the set point value in step 106.

Continuous adaptation of the characteristic, in which the characteristic last specified is adapted, has the advantage that it is possible to dispense with the input of specifying journey data because the characteristic is adapted from standard conditions to the actually existing conditions. However, because the method proceeds on the basis of the most recently prevailing conditions it may occur that, towards the end of a journey which has hitherto proceeded with a shallow characteristic, the energy supply available for a final part in town traffic or to overcome a relatively large hill is so small that it is necessary to drive very slowly.

In contrast, continuous adaptation of the characteristic, in which the initial characteristic is adapted, offers the advantage that the vehicle user can anticipate the necessary allocation of the energy supply by matching the journey data to be input at the beginning of the journey to the driving conditions towards the end of the journey in so far as these are known to him. Since the updated characteristic is always determined on the basis of the initial characteristic, the method takes into account from the outset whether there is a steep or shallow characteristic towards the end of the journey, allowing energy to be saved or used up in advance in expectation of favorable driving conditions.

The third estimation method assumes that the local driving conditions for the stretch of road to be travelled are available to the trip computer in advance and have been parameterized in accordance with the stretch of road, allowing the characteristic corresponding to the stretch of road ahead to be determined at any time on the basis of the said conditions, starting from any point along the route.

Thus, it is possible for an allocation table to be drawn up for a designated stretch of road, e.g. the road from "home to work" during a trial run by the trip computer, in which table the appropriate local characteristic identification for individual successive route sections is stored. Such identification is obtained with the aid of the values for the consumption rate $<K>_i$ and average speed $<v>_i$ obtained on the respective route section i and the characteristic which comes nearest to this pair of values is, for example, allocated. This table makes it possible for the trip computer during the journey to determine a characteristic for the permissible section consumption related to the whole of the stretch of road ahead for each route section i by forming an average of the local characteristics allocated to the route sections ahead. It is advantageous here to select the weight of a local characteristic entering into the average in accordance with the length of the associated route section.

A further use for the third estimation method is obtained if the trip computer of the vehicle is designed to undertake navigation tasks and can access road-network information stored in a memory in order to guide the vehicle user to a destination input at the beginning of the journey. Such navigation systems are known per se and are not described in greater detail here. In what follows, it is assumed that, in addition to road maps and town plans with information on one-way streets, the road-network information also includes altitude data and data on speed limits.

After the destination has been input and the route established, the trip computer first of all uses the road-network information, for example in step 102 in FIG. 2, to generate an allocation table related to the selected route, in which table, as described above, one characteristic identification is entered for each successive route section. For each route section along the route, this allocation table is obtained by means of an evaluation of the local driving conditions. The local driving conditions can be derived from the stored road-network information and are characterized, for example, by the slope derivable from the altitude data and by the expected value of enforced braking and acceleration procedures, it being possible to estimate the latter from the number of intersections determined for a local section of the road. With these local characteristic identifications, it is possible to determine for each point along the stretch of road a characteristic which is related to the whole of the stretch of road ahead and is obtained by averaging the local characteristics corresponding to the route sections ahead.

In comparison with the methods described previously, the estimation method described last provides the best estimated value for the characteristic related to the remaining distance and hence also the best allocation—because anticipatory—of the energy supply. In this method, factors which strongly influence the overall consumption such as, for example, a steep uphill climb at the end of the journey, are advantageously taken into account from the start because the calculation of the set point value for the driving-power limitation includes the driving conditions over the whole of the stretch of road ahead.

The third estimation method described can also be used for the prospective evaluation of alternative routes to the destination before the journey is started. In an advantageous embodiment, provision can be made for the vehicle user to indicate only the destination as journey data at the beginning, whereupon the trip computer determines the optimum route. If several routes are initially possible because the respective distances to the destination do not differ greatly, the trip computer can perform an energy evaluation as follows: for each route, the associated allocation table for the local characteristic identifications is set up and the average characteristic related to the total distance ahead is then determined. This characteristic characterizes the influence of the stretch of road to be travelled on energy consumption and allows an energy evaluation of the alternative routes. With a given permissible consumption for the total distance, it is then possible to determine the corresponding average speed v to be maintained and hence also the anticipated journey time.

The trip computer chooses the route with the shortest journey time and, if required, also indicates alternatives to the vehicle user. The latter decides by an input command on one proposal and allows himself to be guided to the destination by the trip computer.

In the case of electric vehicles, it is significant for the allocation of the energy supply to take into account that the internal resistance of the traction battery (and hence the discharge losses) rises as the charge level falls, the rise being very large at the exhaustion limit. For the efficiency of the energy yield from the accumulator, in this case the battery, it is therefore important to consider whether there is an increased driving resistance stemming, for example, from the climbing of a slope at the beginning or at the end of the stretch of road to be travelled. In choosing between two alternative routes of the same length where there is a hill to be climbed right at the beginning of the first route but only towards the end of the second route, the first route is preferred because of the lower discharge losses. The method according to the invention and the prospective evaluation of alternative routes by the trip computer can thus be optimized by including the power loss involved in the energy removal, which rises with the degree of discharge and therefore with the distance travelled. This can be accomplished, for example, by multiplying the characteristics in FIG. 3 by a factor which is dependent on the current energy supply or, in the case of a precalculation, on the precalculated energy supply and which becomes larger as the energy supply diminishes.

Another conceivable evaluation method consists in determining, by comparison of variants, with which speed modulation pattern the stretch of road can be travelled in the shortest time with a given energy supply, taking into account the topography and the distribution of legally allowed speeds along the said stretch of road. The optimum modulation pattern can then be used to specify the average speed to be maintained.

Figure 4:
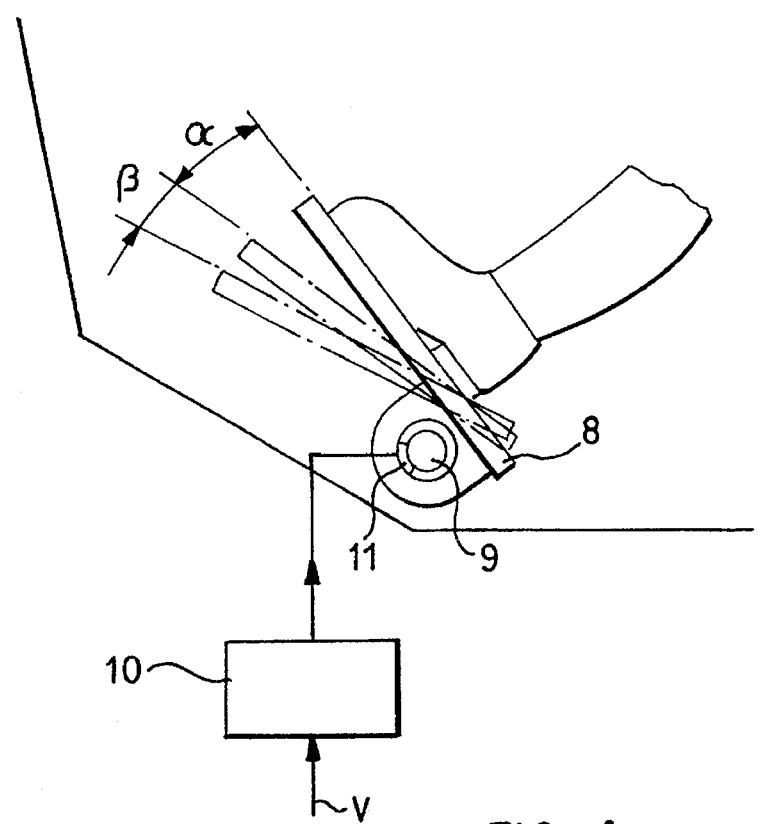
FIG. 4 shows a device for driving-power limitation.

A device according to the invention for driving-power limitation is shown in FIG. 4. The device essentially represents an electronic accelerator pedal where, in a manner known per se, the position of the accelerator pedal 8 is detected by means of a potentiometer 9 and passed to a drive control system (not shown). According to the invention, the structurally provided travel of the accelerator pedal 8 is divided into two ranges which are represented by the angles α and β. The angle α covers the power range below the power range of the vehicle inhibited in accordance with the set point value V. In the range of the angle β, the accelerator pedal can only be operated with an increased actuating force. This angular range makes available a controllable kickdown function in which it is possible to specify higher driving powers in a continuously increasing manner. The power range extends from the power which the set point value V still just permits to the maximum power of the drive.

In a first embodiment, the entire pedal travel is divided into the fixed angles α and β, the freely available and the inhibited power range each being assigned to the partial pedal travels.

In a second embodiment, the division of the pedal travel into the angles α and β is made variable, a positioning motor displacing a stop 11 for the additional spring force at the beginning of the angular range β. The positioning motor is controlled by a control unit 10 in accordance with the set point value V. This embodiment has the advantage that, if the energy supply is sufficient, when the maximum power of the drive can be demanded over the entire distance, the angle β can be returned to zero. The entire pedal travel is thus available when driving, without driving-power limitation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for regulating driving-power of a vehicle as a function of at least a distance to a destination and of an available energy supply of the energy accumulator providing the driving power, said method comprising the steps of:

first, at the beginning of a journey, entering journey data into a trip computer via an input unit, from which data at least a total distance to the destination can be determined;

second, during the journey, determining at least a currently remaining distance to said destination;

third, during the journey, measuring a remaining energy supply which is currently available in said energy accumulator;

fourth, during the journey, determining in said trip computer a permissible nominal energy consumption rate which enables said vehicle to travel the remaining distance based on the measured currently available energy supply and determined remaining distance to the destination;

fifth, controlling a set point value for a device for driving-power limitation based on the permissible nominal energy consumption rate so that the driving power is limited more severely the smaller the permissible nominal consumption rate determined; and sixth repeating said second through fifth steps throughout the journey, whereby said permissible nominal energy consumption rate is continuously updated.

2. Method according to claim 1, wherein the journey data that can be input comprise journey data relating to driving conditions which characterize factors that influence the energy consumption.

3. Method according to claim 1, wherein the set point value is determined from the permissible nominal energy consumption rate by means of a characteristic which is one of: predetermined, and selectable from a family of characteristics by means of specifying journey data.

4. Method according to claim 3, wherein during driving, the characteristic is modified based on at least an average speed achieved over a route section travelled and an energy consumption over said route section for this average speed.

5. Method according to claim 3, wherein during driving, at least the average speed achieved over a route section travelled and the energy consumption rate required for this average speed, are used to establish a new characteristic corresponding to the existing driving conditions.

6. Method according to claim 3, comprising the further steps of:

for successive route sections along a stretch of road to be travelled, determining respective corresponding characteristic values which best convey the relationship between energy consumption and the set point value for each such route section; and storing said characteristic values in an allocation table.

7. Method according to claim 6, wherein during driving, a continuously updated characteristic related to distance ahead, which is formed by averaging local characteristics related to route sections, is taken as a basis for the characteristic for determining the set point value, the average being formed only of the local characteristics which correspond to route sections ahead.

8. Method according to claim 6, wherein the allocation table is formed by:

identifying local characteristics during a trial run along a selected stretch of road to be travelled by means of vehicle-related measurement data, including at least the average speed achieved over a route section and the section consumption required for this speed; and entering said local characteristics in the allocation table for each route section.

9. Method according to claim 1, wherein the trip computer can access road-network information which also contains data on contour lines and/or speed limits and, after the inputting of the destination, determines therefrom at least the total distance on the selected stretch of road to be travelled.

10. Method according to claim 6, wherein the trip computer forms the allocation table by determining for individual route sections a characteristic identification corresponding to local driving conditions by means of the stored road-network information.

11. Method according to claim 10, wherein the method designed for use during driving is also used before the beginning of a journey for the prospective evaluation of alternative routes.

12. Method according to claim 1, wherein said vehicle is an electric vehicle operated with a traction battery, and wherein discharge losses, which are dependent on the charge level, influence the set point value in such a way that the driving power is limited more severely the greater the discharge losses.

13. Method according to claim 9, wherein to evaluate alternative routes, the trip computer determines an optimized speed modulation pattern for each route and evaluates it according to energy consumption and journey time.

14. Apparatus for limiting driving-power of a vehicle as a function of a destination and of an energy supply of the energy accumulator providing the driving power, by the steps of (i) at the beginning of a journey a driver of the vehicle specifies journey data to a trip computer via an input unit, from which data at least a total distance to the destination can be determined; (ii) during the journey, a trip computer repeatedly determines a permissible nominal energy consumption rate to travel the distance ahead on the basis of the measured current energy supply; and (iii) the nominal energy consumption rate is used to derive a set point value for a device for driving-power limitation so that the driving power is limited more severely the smaller the nominal consumption rate determined, said apparatus comprising:

an input unit for inputting at least route information concerning said journey;

a trip computer coupled to receive said route information, for performing said steps for limiting driving power;

a data memory;

a distance recorder;

an energy supply recorder;

a display unit; and a device for driving power limitation in response to instructions from said trip computer.

15. Device for limiting driving-power of a vehicle with an electronic accelerator pedal as a function of a set point value in the drive control, wherein:

a power range of said vehicle is divided into a freely available, lower power range and an upper, inhibited power range;

a travel range of the accelerator pedal is divided into two angular ranges, a first angular range ($\alpha$) being allocated to the freely available power range and a second angular range ($\beta$) requiring an increased actuating force and being allocated to the inhibited power range.

16. Device according to claim 15, wherein a stop for dividing the pedal travel into the two angular ranges ($\alpha$, $\beta$) can be adjusted by means of a positioning motor which is controlled by a control unit as a function of the set point value.

* * * * *